(12) United States Patent  (10) Patent No.: US 8,075,217 B2
Eason  (45) Date of Patent: Dec. 13, 2011

(54) TELESCOPING MEMBER METHODS AND APPARATUS

(75) Inventor: Donald H. Eason, Fort Collins, CO (US)

(73) Assignee: Swift Distribution, Inc., Loveland, CO (US)

(*) Notice: Subject to any disclaimer, the term of this patent is extended or adjusted under 35 U.S.C. 154(b) by 332 days.

(21) Appl. No.: 10/586,115

(22) PCT Filed: Jan. 14, 2005

(86) PCT No.: PCT/US2005/000768
§ 371 (c)(1),
(2), (4) Date: Jul. 14, 2006

(87) PCT Pub. No.: WO2005/070132
PCT Pub. Date: Aug. 4, 2005

(65) Prior Publication Data
US 2008/0247810 A1  Oct. 9, 2008

Related U.S. Application Data

(60) Provisional application No. 60/536,791, filed on Jan. 14, 2004.

(51) Int. Cl.
*F16B 7/10* (2006.01)
(52) U.S. Cl. .............. 403/109.1; 403/290; 403/341; 403/344; 403/373; 403/374.5
(58) Field of Classification Search ............. 403/109.1, 403/286, 292, 293, 341, 344, 373, 309–313, 403/290, 374.5
See application file for complete search history.

(56) References Cited

U.S. PATENT DOCUMENTS

| 742,453 | A | 10/1903 | Lake |
| 1,309,375 | A | 6/1919 | Taylor |
| 1,376,593 | A | 5/1921 | Tuttle |
| 1,970,624 | A | 8/1934 | Recker |
| 2,817,548 | A | 10/1955 | Uthemann |
| 2,902,592 | A | 9/1959 | Cole et al. |

(Continued)

FOREIGN PATENT DOCUMENTS
DE  815096  * 8/1951
(Continued)

OTHER PUBLICATIONS

Gibraltar Hardware, "Rack Factory" #GRS400C, Gibraltarhardware.com, Jan. 9, 2004, 2 pages.

(Continued)

*Primary Examiner* — Victor MacArthur
(74) *Attorney, Agent, or Firm* — Santangelo Law Offices

(57) ABSTRACT

In at least one embodiment, an apparatus (1) that comprises a compression sleeve element (2) established at least partially around portions of a first elongated member (6) that telescopes from a larger elongated member (8) in which it may nest. A relative motion obstruction element (4) may disallow only certain types of motion, e.g., rotational and axial, of the compression sleeve element relative to the elongated members around which it may be at least partially established. As it may be the compression enhancement element (3)—which may be used to generate a retaining compression force element—that prevents perpendicular displacement of the compression sleeve element, deactivation and effective disengagement of the compression enhancement element may allow for a quick removal of the compression sleeve element without requiring that it be slid off an end of either elongated member.

32 Claims, 7 Drawing Sheets

U.S. PATENT DOCUMENTS

| | | | |
|---|---|---|---|
| 3,290,770 | A * | 12/1966 | Silverman et al. |
| 3,463,520 | A | 8/1969 | Turro |
| 3,495,853 | A * | 2/1970 | Furrer |
| 3,514,091 | A | 5/1970 | Johnson et al. |
| 3,603,623 | A | 9/1971 | Widman |
| 3,604,734 | A | 9/1971 | Friedman et al. |
| 3,823,245 | A | 7/1974 | Suzuki |
| 3,981,491 | A | 9/1976 | Snyder |
| 3,997,724 | A | 12/1976 | Seebinger |
| 4,102,219 | A | 7/1978 | Plamper |
| 4,111,575 | A | 9/1978 | Hoshino |
| 4,140,415 | A | 2/1979 | Koyamato |
| 4,185,936 | A | 1/1980 | Takahashi |
| 4,227,049 | A | 10/1980 | Thomson et al. |
| 4,397,088 | A * | 8/1983 | Hampel .................. 403/312 |
| 4,405,107 | A | 9/1983 | Clyburn |
| 4,408,924 | A * | 10/1983 | Huebner .................. 403/341 |
| 4,430,017 | A | 2/1984 | Stefancich |
| 4,479,414 | A | 10/1984 | Willis |
| 4,497,092 | A * | 2/1985 | Hoshino |
| 4,576,501 | A * | 3/1986 | McConnell .................. 403/377 |
| 4,579,229 | A | 4/1986 | Porcaro et al. |
| 4,593,596 | A | 6/1986 | Gauger |
| 4,596,484 | A | 6/1986 | Nakatani |
| 4,606,525 | A | 8/1986 | Lombardi |
| 4,671,479 | A | 6/1987 | Johnson et al. |
| 4,691,611 | A | 9/1987 | May |
| D295,471 | S | 5/1988 | Lindskog |
| 4,744,690 | A | 5/1988 | Hsieh |
| 4,761,092 | A | 8/1988 | Nakatani |
| 4,768,798 | A | 9/1988 | Reed et al. |
| 4,770,380 | A | 9/1988 | Eason et al. |
| 4,818,135 | A | 4/1989 | Desjardins |
| D306,943 | S | 4/1990 | Hodge et al. |
| 5,029,796 | A | 7/1991 | Schoenig |
| D320,034 | S | 9/1991 | Brooks et al. |
| 5,048,789 | A | 9/1991 | Eason et al. |
| 5,063,821 | A | 11/1991 | Battle |
| 5,069,254 | A | 12/1991 | Vogelsang |
| D326,969 | S | 6/1992 | Eason et al. |
| 5,140,889 | A | 8/1992 | Segan et al. |
| D329,342 | S | 9/1992 | Schoenig |
| 5,154,449 | A | 10/1992 | Suei-Long |
| 5,161,761 | A | 11/1992 | May |
| 5,182,416 | A | 1/1993 | Schweizer |
| D336,099 | S | 6/1993 | Schoenig |
| 5,337,646 | A | 8/1994 | Austin |
| D356,901 | S | 4/1995 | Schoenig et al. |
| D358,048 | S | 5/1995 | Schoenig et al. |
| D364,281 | S | 11/1995 | Eason |
| 5,520,292 | A | 5/1996 | Lombardi |
| 5,531,148 | A | 7/1996 | Wilson |
| D372,691 | S | 8/1996 | Eason |
| D375,639 | S | 11/1996 | House et al. |
| 5,570,968 | A | 11/1996 | Sassmannshausen et al. |
| 5,726,369 | A | 3/1998 | Gilday |
| 5,738,326 | A * | 4/1998 | Liao |
| 5,744,738 | A | 4/1998 | Gatzen |
| D400,565 | S | 11/1998 | Ahl |
| D400,735 | S | 11/1998 | House et al. |
| 5,857,649 | A | 1/1999 | Eason |
| 5,911,523 | A | 6/1999 | Burchart |
| 5,926,961 | A * | 7/1999 | Uhl .................. 403/109.1 |
| 5,929,355 | A | 7/1999 | Adinolfi |
| 5,949,008 | A | 9/1999 | Augsburger |
| D416,464 | S | 11/1999 | Eason |
| 5,996,814 | A | 12/1999 | Workman et al. |
| D421,447 | S | 3/2000 | Eason et al. |
| 6,062,396 | A | 5/2000 | Eason |
| D435,365 | S | 12/2000 | Eason et al. |
| 6,283,421 | B1 | 9/2001 | Eason et al. |
| D450,339 | S | 11/2001 | Eason |
| 6,312,184 | B1 * | 11/2001 | Hoshino .................. 403/344 |
| 6,343,802 | B1 | 2/2002 | Workman et al. |
| 6,375,135 | B1 | 4/2002 | Eason et al. |
| 6,513,846 | B2 * | 2/2003 | McCauley .................. 403/109.1 |
| 6,557,878 | B2 * | 5/2003 | Chen |
| 6,610,916 | B1 | 8/2003 | Torrez |
| 6,653,540 | B2 | 11/2003 | Izen et al. |
| 6,719,257 | B1 | 4/2004 | Greene et al. |
| 6,722,810 | B1 | 4/2004 | Tachikawa |
| D492,587 | S | 7/2004 | Eason |
| D493,363 | S | 7/2004 | Eason |
| 6,789,772 | B2 | 9/2004 | Eason |
| 6,814,332 | B2 | 11/2004 | Eason |
| 6,830,227 | B2 | 12/2004 | Nakatani |
| 2002/0030146 | A1 | 3/2002 | Akaike |
| 2006/0177260 | A1 * | 8/2006 | Liao .................. 403/109.1 |

FOREIGN PATENT DOCUMENTS

| | | |
|---|---|---|
| WO | WO 95/20107 | 7/1995 |
| WO | WO 2005/067541 A2 | 7/2005 |
| WO | WO 2005/070123 A2 | 8/2005 |
| WO | WO 2005/070132 A2 | 8/2005 |
| WO | WO 2005/070132 A3 | 8/2005 |
| WO | WO 2005/070184 A2 | 8/2005 |

OTHER PUBLICATIONS

Gibraltar Hardware, "Rack Factory" GRS400C, Gibraltarhardware.com, Oct. 25, 2004, 2 pages, Ride/Crash Overhead Station and Xhat to boom and Rack Options.

Gibraltar Hardware, "Rack Factory" GRS400C, Gibraltarhardware.com, Oct. 25, 2004, 2 pages, Mini Snare on Curved Support Tube Option.

Gibraltar Hardware, "Rack Factory" GRS400C and GRS150C, Gibraltarhardware.com, Oct. 25, 2004, 2 pages, Boom Arm to Rack and Multi-Cymbal Overhead Station Options.

Gibraltar Hardware, "Rack Factory" GRS250C, Gibraltarhardware.com, Oct. 25, 2004, 2 pages, Multi Cymbal Setup to rack, Mini Timbale to Rack, Tambourine to Open Tube, and Percussion Table to Open Tube Options.

Gibraltar Hardware, "Rack Factory" GRS350C, Gibraltarhardware.com, Oct. 25, 2004, 2 pages, Triple Cymbal Station to Rack and Large Tom to Rack Options.

Pintech, USA, Control the Sound with America's E Drum Color Brochure, 2004, 5 pages.

Roland Corporation, roland.com MDS-10RD, printed from website as of Nov. 5, 2004.

Roland Corporation, roland.com MDS-8C, printed from website as of Nov. 5, 2004.

Roland Corporation, roland.com MDS-6, printed from website as of Nov. 5, 2004.

Tama Hardware, PMD300FC Power Tower System, tama.com, Jan. 9, 2004, 1 page.

Tama Hardware, PMD800SS Power Tower System, tama.com, Jan. 9, 2004, 2 pages.

Ultimate Support Systems, Inc. 1992 Bicycle Repair Station Product Brochure (2 pages).

Ultimate Support Systems, Inc. 1993 Bicycle Support Product Catalog and Price List.

Ultimate Support Systems, Inc. 1993 Product Catalog (Music Stand Edition).

Ultimate Support Systems, Inc. 1994 Product Catalog (Music Stand Edition).

Ultimate Support Systems, Inc. 1995 Bicycle Support Domestic Confidential Dealer Price List.

Ultimate Support Systems, Inc. 1996 Product Catalog (Music Stand Edition).

Ultimate Support Systems, Inc. 1998 Product Catalog (Music Stand Edition).

Ultimate Support Systems, Inc. 1999 Product Catalog (Music Stand Edition).

Ultimate Support Systems, Inc. 2000 Product Catalog (Music Stand Edition).

Ultimate Support Systems, Inc. 2000 Bicycle Support Product Catalog.

Ultimate Support Systems, Inc. 2001 Product Catalog (Music Stand Edition).

Ultimate Support Systems, Inc. 2001/2002 Bicycle Support Product Catalog.

Ultimate Support Systems, Inc. 2002 Product Catalog (Music Stand Edition).
Ultimate Support Systems, Inc. 2003 Product Catalog (Music Stand Edition).
Ultimate Support Systems, Inc. 2004 Product Catalog (Bicycle Stand Edition).
Ultimate Support Systems, Inc. 2004 Product Catalog (Music Stand Edition).
Ultimate Support Systems, Inc. 2005 Product Catalog (Bicycle Stand Edition).
Ultimate Support Systems, Inc. 2005 Product Catalog (Music Stand Edition).
Yamaha Percussion System Drum Rack.

* cited by examiner

TELESCOPING MEMBER METHODS AND APPARATUS

This is a United States national phase application of international application PCT/US2005/000768, filed Jan. 14, 2005, published as WO2005/070132 on Aug. 4, 2005, and claiming benefit of and priority to United States Provisional Application, 60/536,791, filed Jan. 14, 2004, both said applications hereby incorporated herein by reference.

TECHNICAL FIELD

The technical field to which certain embodiments of the inventive technology relate is releasable retention of adjustable telescoping members.

DISCLOSURE OF INVENTION

Generally, the inventive technology disclosed herein relates to a novel and useful retention apparatus for telescoping members, the apparatus usable to hold members in a desired fixed relative position. Applications of the inventive apparatus and methods include when and wherever telescoping member capability is desired, such as adjustable stands (e.g., musical instrument stands) or reconfigurable support apparatus generally.

BACKGROUND

Some considerations relative to the use of telescoping member retention apparatus will be discussed to facilitate an understanding of the relevant technology. Telescoping members, often but not always telescoping tubes, frequently are found with apparatus that enable the retention of the two members in a desired relative position. Indeed, there are many such retention apparatus. But prior art apparatus, as evolved as they may be, still are not without their problems. Whether the problems that inhere in such technology relate to limitations associated with adequately securing the apparatus to the larger member in which the smaller member is nested (whether while the apparatus is operating to relatively retain the members or while the apparatus is in an adjustment configuration), and/or have a complexity of design that compromises operation, durability or repair speed, prior art apparatus often leave users dissatisfied. Certain embodiments of the present inventive technology may solve one or more of these problems, or at least relieve them to a noticeable extent.

BRIEF DESCRIPTIONS OF THE DRAWINGS

MODES FOR CARRYING OUT THE INVENTION

Figure 1:
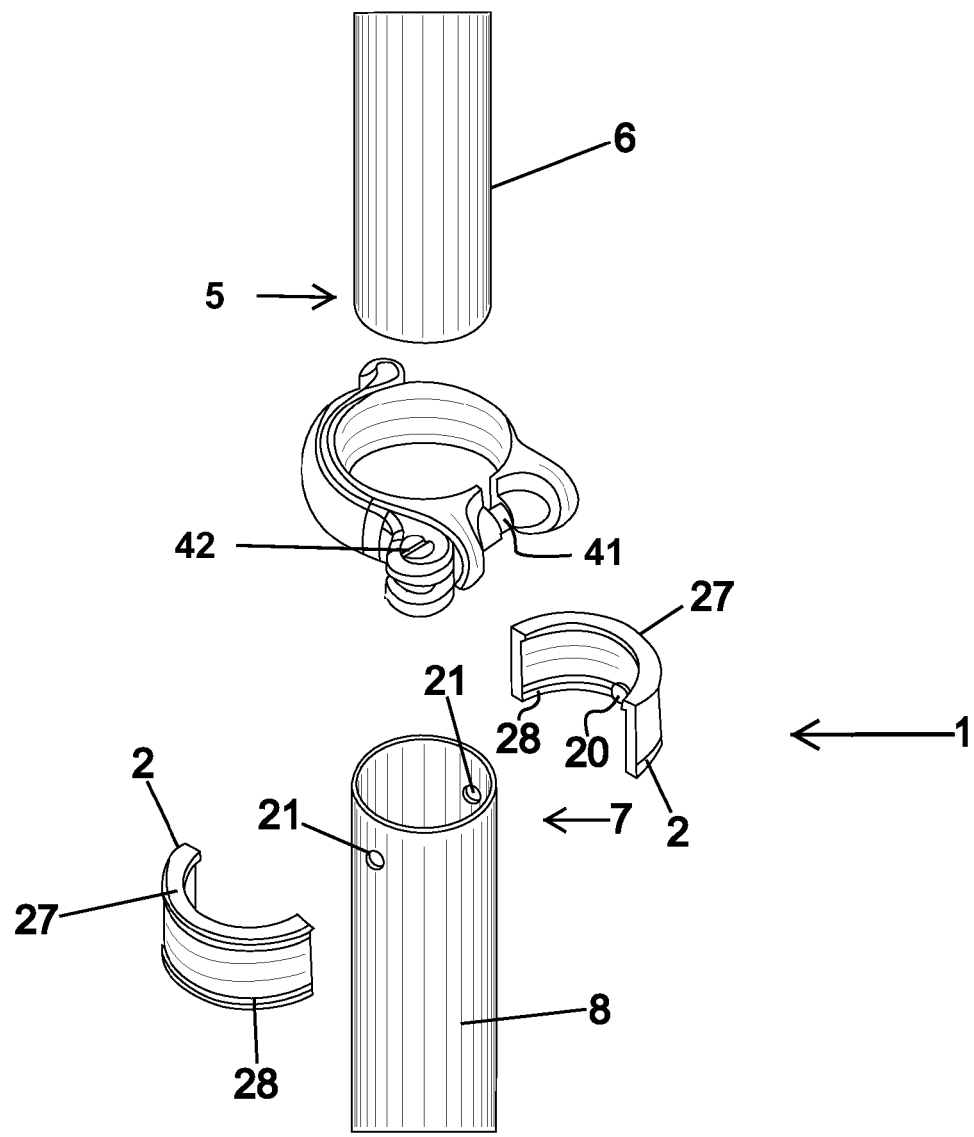
FIG. 1 shows an exploded view of an embodiment of the inventive apparatus, in addition to elongated members.

The present inventive technology includes a variety of aspects, which may be combined in different ways. The following descriptions are provided to list elements and describe some of the embodiments of the present inventive technology. These elements are listed with initial embodiments, however it should be understood that they may be combined in any manner and in any number to create additional embodiments. The variously described examples and preferred embodiments should not be construed to limit the present inventive technology to only the explicitly described systems, techniques, and applications. Further, this description should further be understood to support and encompass descriptions and claims of all the various embodiments, systems, techniques, methods, devices, and applications with any number of the disclosed elements, with each element alone, and also with any and all various permutations and combinations of all elements in this or any subsequent application.

In at least one embodiment of the inventive technology, a retention apparatus (1) may comprise a compression sleeve element (2), a compression enhancement element (3), and a relative motion obstruction element (4). The compression sleeve element, whether it includes one or more parts, may be adapted to at least partially surround a first portion (5) of a first elongated member (6) and a second portion (7) of a larger elongated member (8), where a third portion (9) of the first elongated member may be nested in at least a fourth portion (10) of the larger elongated member. Such third and fourth portions of the elongated members may be co-axial. An elongated member is deemed a larger elongated member whenever it can have nested in it (meaning at least a portion of it) a portion of a different elongated member; the elongated member that has the different elongated member nested within is larger than that nested member. Such nesting is common in telescoping apparatus such as telescoping tubes. Indeed in some embodiments, each the first elongated member and the larger elongated member may be hollow tubes, whether circular in cross-section or not, although only the fourth portion of the larger elongated member need be hollow. It should be understood that the term hollow, as used herein, is a broad term that describes something or a part thereof that is not entirely solid and defines an inner space (whether that space be cylindrical, tubular or have some other shape). It should also be understood that the term elongated member is a broad term that describes, e.g., any structural member that has a length dimension that dominates its width (e.g., where the length of the member is at least twice its width). Further, it should be noted that the elongated members need not be established vertically during operation, as angled or sideways established configurations are also part of the inventive technology. Elongated members also need not be straight along their entire lengths.

The term "at least partially surround" connotes at least partial, opposing establishment of one part or structure around another (see, e.g., FIG. 1). The compression sleeve element may have a first elongated member compression surface (11) and a larger elongated member compression surface (12) that act to transfer a compression force to the first elongated member and the larger elongated member, respectively. In some embodiments, the first elongated member compression surface may be an inner part of an inwardly projecting, annular (or partially annular) lip that overhangs at least part of an edge of the larger elongated member. Additionally, for purposes relative to clarity of description of the inventive technology, the at least a fourth portion of the larger elongated member may have a larger elongated member longitudinal axis (14). It should be noted that the term "at least a fourth portion" may be used because, indeed, it may be that in some embodiments of the inventive technology the entire larger elongated member may have nested within it the third portion of the first elongated member.

Figure 2:
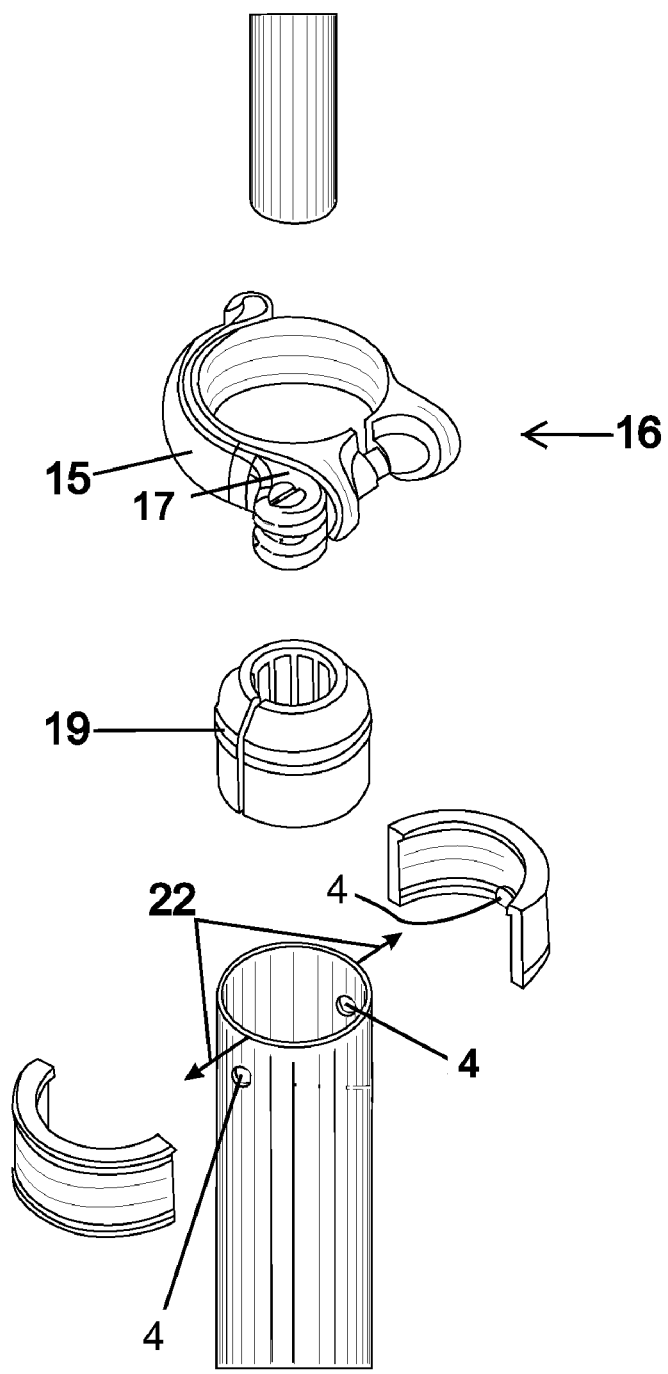
FIG. 2 shows an exploded view of an embodiment of the inventive apparatus including an annular gap filler, in addition to elongated members.
Figure 3:
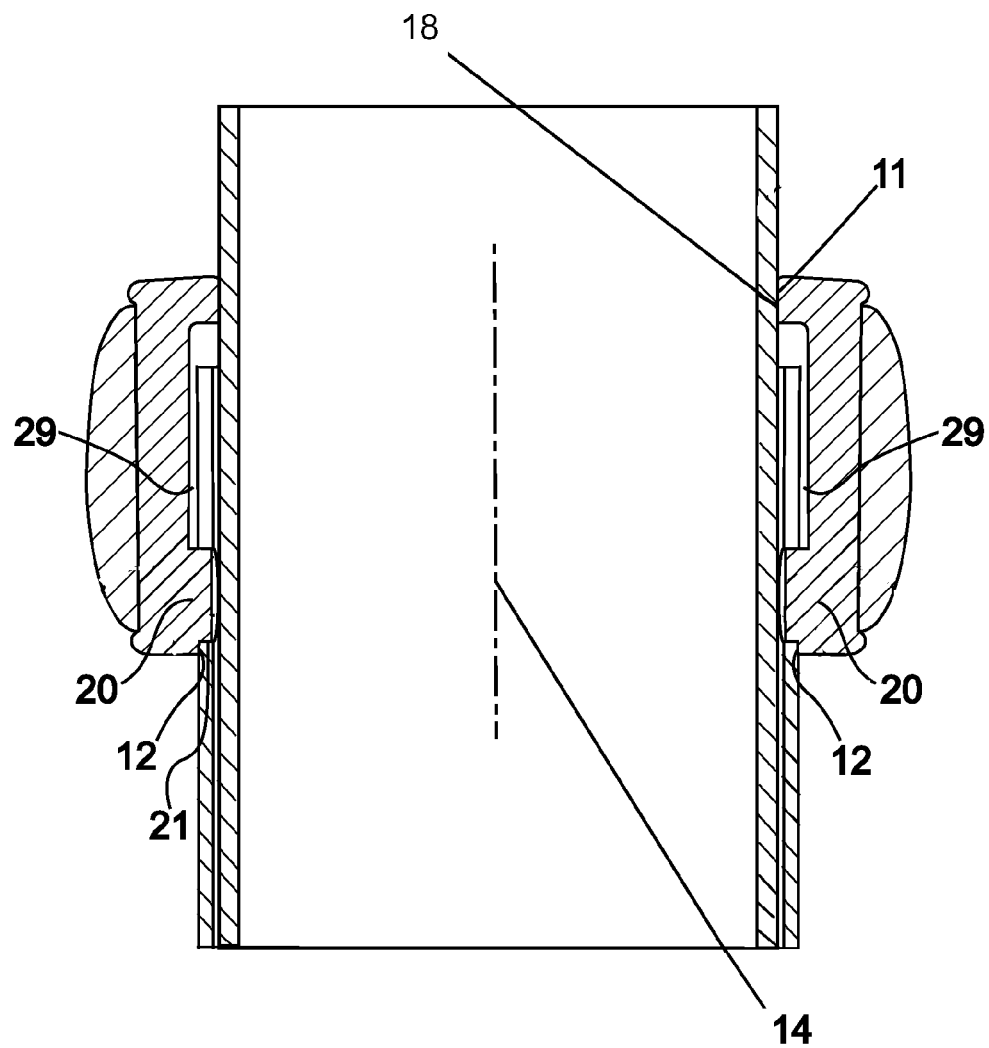
FIG. 3 shows a cut-away view of an embodiment of the inventive apparatus in retention configuration as is exhibited upon activation of the compression enhancement element.
Figure 4:
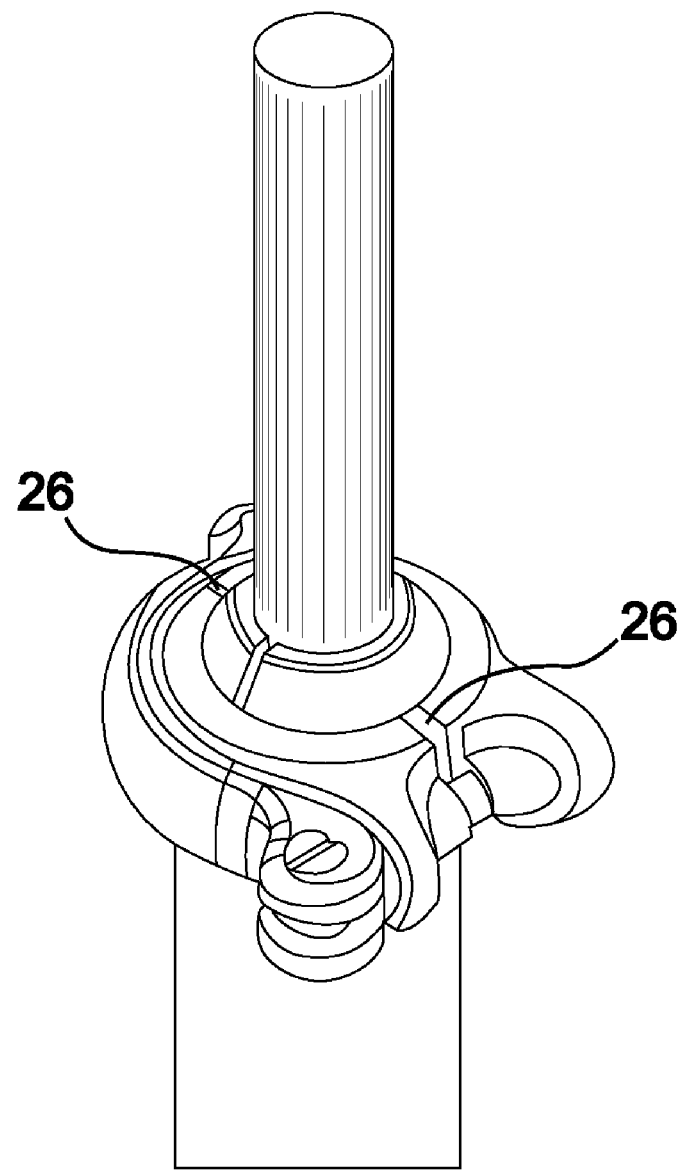
FIG. 4 shows a view of a fully assembled embodiment of the inventive apparatus (with annular gap filler) in retention configuration.
Figure 5:
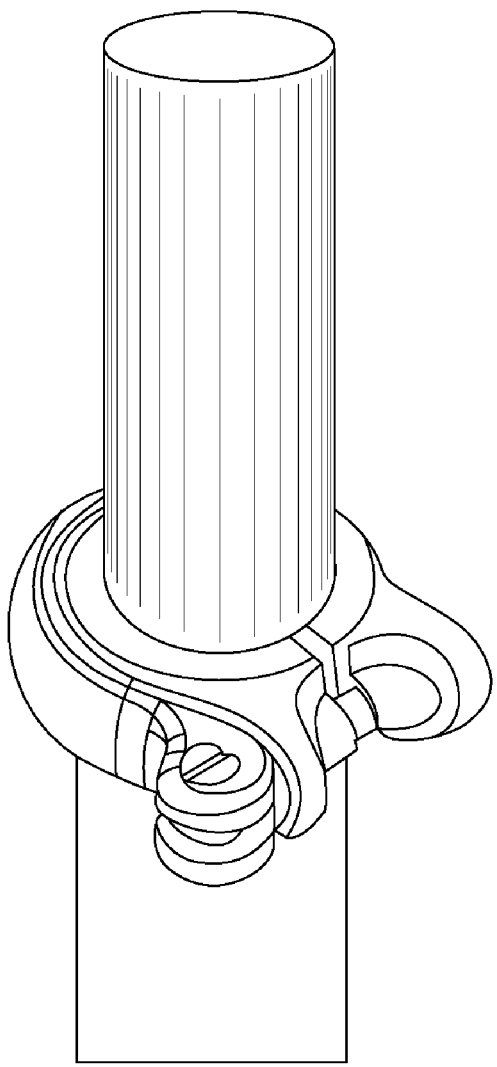
FIG. 5 shows a view of a fully assembled embodiment of the inventive apparatus in retention configuration.
Figure 6:
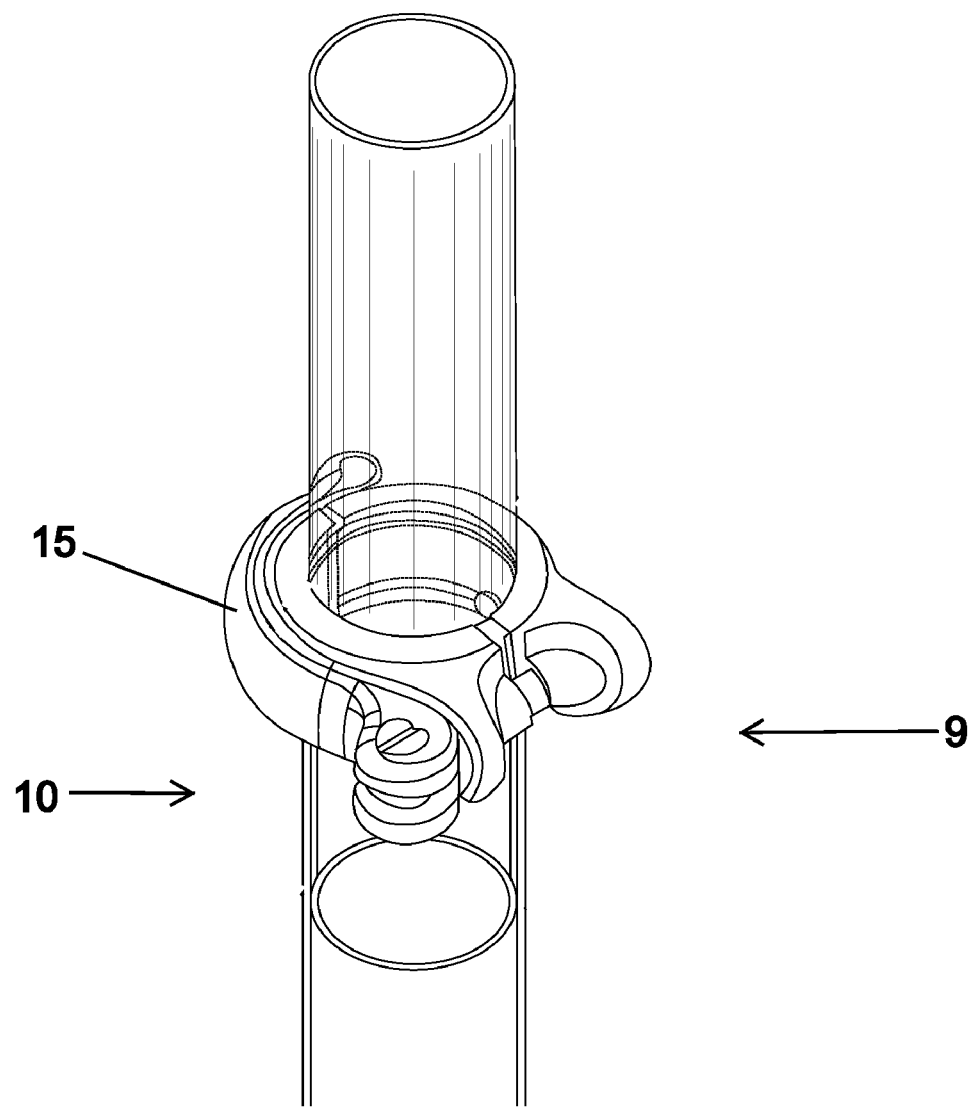
FIG. 6 shows a view of a fully assembled embodiment of the inventive apparatus (with phantom tubing) in retention configuration.
Figure 7:
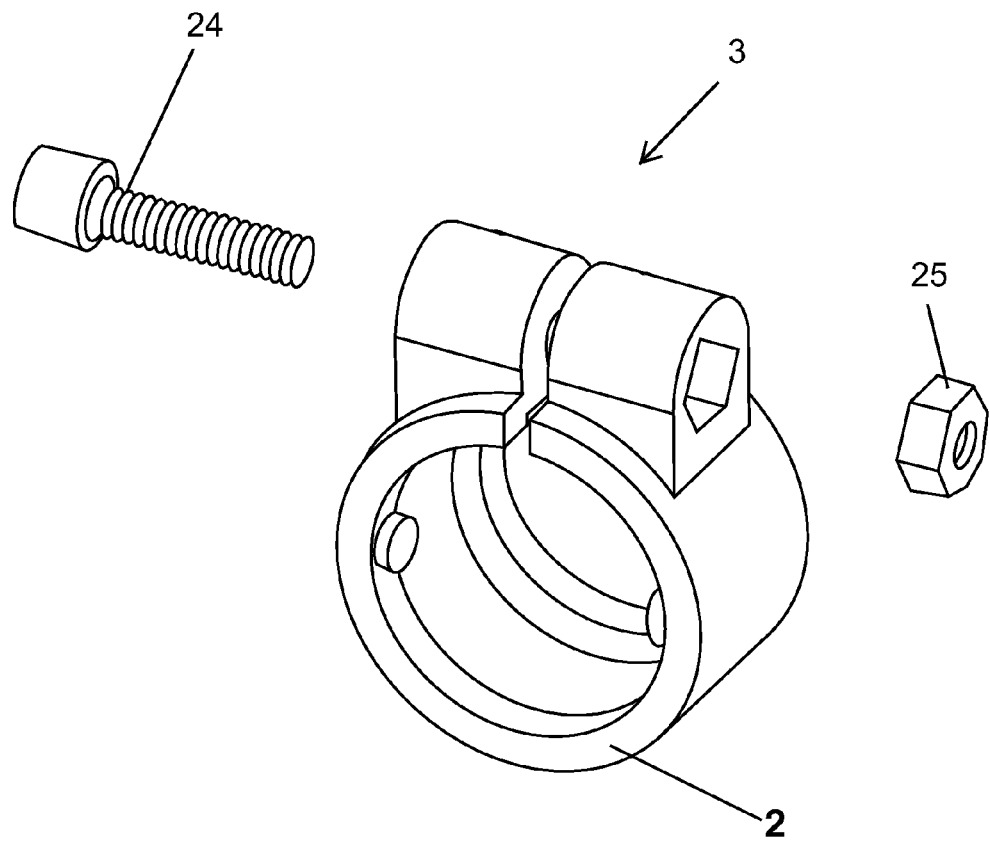
FIG. 7 shows an exploded view of a disassembled, non-levered embodiment of the inventive apparatus.

The inventive technology may include a compression enhancement element that is situated so that, upon its activation (e.g., upon rotation of a clamping lever (15) of a clamp (16) having an eccentric cam (17) and/or sufficient rotation of a threaded bolt (24) into a nut (25), as in cases where there is no clamping lever (see FIG. 7)), it forces the larger elongated member compression surface towards the larger elongated member, and the first elongated member compression surface towards a site (18) on the first elongated member that is not within the larger elongated member, thereby retaining the first elongated member in fixed position relative to the larger elongated member. The term "forces...towards" describes that which occurs whenever a compressive force is generated; the term is broad enough to cover the case where each of the aforementioned compression surfaces are either in direct contact with a respective elongated member or not. Similarly, one part may surround or partially surround another (or be around or be partially around another) notwithstanding the absence of direct contact between the two parts. Of course, direct contact may be absent where there is established within at least part of the larger elongated member (e.g., a second portion thereof) an annular gap filler (19) whose purpose may be to fill a space between part of the larger elongated member and part of the first elongated member nested within. Often, however, the first elongated member compression surface is adequately sized (e.g., small enough in diameter) to directly contact the first elongated member, rendering an annular gap filler unnecessary. Of course, the use of significantly differently sized tubes as part of a telescoping apparatus is one way in which this problem may arise. It should be understood that, as used herein, annular does not require a cross-section having concentric or even circular inner and/or outer surface cross-section shapes. Indeed, as but one example, the inner shape may be vertically ribbed such that it contacts the first elongated member at only intermittent vertical sections (e.g., see FIG. 2).

A relative motion obstruction element (4) may also be part of the inventive apparatus and may be adapted to prevent only axial and rotational motion of the compression sleeve element relative to the larger elongated member. The relative motion obstruction element may be established as part of the compression sleeve element and the larger elongated member. As such, it may prevent motion of the compression sleeve element relative to the larger elongated member. It should be noted that the term element as used in this application may describe not only one part or structure, but also a plurality of parts or structures (20) e.g., that make up a device. As such, in at least one embodiment of the inventive technology, the relative motion obstruction element may include at least one projection (21) (e.g., a post, which may have any cross-sectional shape and which may project inwardly from the compression sleeve element), and at least one recess (e.g. a hole) sized to receive the post, thereby preventing axial and rotational motion. Of course, a projection may be engaged with a recess upon establishment of the projection in the recess.

It should be noted also that the relative motion obstruction element is not intended to prevent all types of motion of the compression sleeve element relative to the larger elongated member. Indeed, in the preferred embodiments, the relative motion obstruction element, even when engaged, does not prevent perpendicular (22) (e.g., radial) displacement of the compression enhancement element relative to the larger elongated member longitudinal axis. Such perpendicular displacement is prevented by the compression enhancement element when activated. That such motion is prevented by the compression enhancement element (and not by the relative motion obstruction element) may enable the compression sleeve element to be easily removed upon deactivation of and effective disengagement of the compression enhancement element. It should be noted that perpendicular displacement occurs whenever the displacement has any component in a perpendicular direction.

Deactivation of the compression enhancement element connotes manipulation of the compression retention element only such that the compressive force that retains the first elongated member in fixed relative position is removed. Deactivation is a step that is different and exclusive of the step of effective disengagement, discussed below. In embodiments where there is no clamping lever, deactivation may involve the sufficient loosening of a threaded bolt 24 to just release the compressive force that retains the first elongated member in fixed position relative to the larger elongated member. In embodiments where there is a clamping lever (see, e.g. FIG. 1), deactivation may only involve the manipulation of the lever to just remove the compressive force. In embodiments where there is a clamping lever, there may be a first pin 41 and second pin 42 system (the lever, pins and collar all considered parts of the compression enhancement element), but in such levered designs, activation and deactivation of the compression enhancement element typically does not involve manipulation of that pin or bolt. After deactivation, the first elongated member may be movable relative to the larger elongated member.

Effective engagement connotes at the least the establishment of the compression enhancement element at least partially around the compression sleeve element such that the compression enhancement element does not fall from this position because of gravity or other anticipated force and such that it cannot be perpendicularly removed from this position. In cases where the compression enhancement element is non-levered, it may involve merely the establishment of a bolt (24) into receptive holes and the sufficient initiation of threading of the bolt into a nut (25). In cases where the compression enhancement element is levered, it may involve the establishment of a first pin 41 into receptive holes and the sufficient initiation of threading of the first pin into a nut so a subsequent operation of the lever effects a compressive force to retain the first elongated member in fixed position relative to the larger elongated member.

Effective disengagement, which may not necessarily be the reverse of effective engagement, may involve different steps depending on the type of compression enhancement element. In levered designs, effective disengagement may merely involve the local displacement (after deactivation, of course) of the compression enhancement merely to expose the compression sleeve element so that it may be removed without obstruction. In non-levered designs, effective disengagement may involve the removal of a bolt from holes through which it may pass (and might not require any local displacement of the compression enhancement element). Indeed, in such a design, the removal of the compression enhancement element may occur simultaneously with the removal of the compression sleeve element. It is of note that although the preferred type of non-levered design involves a compression enhancement element that is at least partially integral with the compression sleeve element (see, e.g. FIG. 7), collared designs (where the compression enhancement element is not integral with the compression sleeve element) that are not levered are also within the ambit of the inventive technology.

Upon deactivation and effective disengagement of the compression enhancement element, the compression sleeve element may have the advantage of perpendicular displaceability, and perpendicular removability, allowing for a quick disassembly without the need to slide the compression enhancement element either along either of the elongated members. Of course, perpendicular may be relative to the larger elongated member longitudinal axis, and include radial in cases where the first elongated member is substantially circular in cross-section.

What may facilitate such quick removal may be that the compression sleeve element is separated along at least one split (26) from a first elongated member proximate edge (27) of the compression sleeve element to a larger elongated member proximate edge (28) of the compression sleeve element. Where there are two (or more) splits that separates the compression sleeve element in two (or more) parts (see, e.g. FIG. 1), the compression sleeve element might not require any application of manual force (or it may require only a slight application of manual force) to remove it; where there is only one split (see, e.g., FIG. 7), to remove the compression sleeve element it may be necessary to apply a force to overcome the obstructive effect posed by the second portion of the larger elongated member.

It should also be noted that the compression sleeve element may be shaped to provide a clearance (29) from the larger elongated member between the first elongated member compression surface and the larger elongated member compression surface. Such clearance may ensure that the compression force acts against the first elongated member as intended (instead of being blocked by the larger elongated member). In preferred embodiments, the first elongated member compression surface has a characteristic dimension (e.g., a radius) that is less than a characteristic dimension of the larger elongated member compression surface.

Of course, as is the purpose of many telescoping member retention apparatus, before activation of the compression enhancement element the first elongated member may be adjusted to a desired position relative to the larger elongated member. Then, upon activation of the compression enhancement element, it may be held in this position.

As can be easily understood from the foregoing, the basic concepts of the present invention may be embodied in a variety of ways. It involves (but is not limited to) both retention techniques as well as devices to accomplish the appropriate retention. In this application, the support or attachment techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicants right and may be designed to yield a patent covering numerous aspects of the invention both independently and as an overall system.

Further, each of the various elements of the invention and claims may also be achieved in a variety of manners. Additionally, when used, the term "element" is to be understood as encompassing individual or singular, as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "clamp" should be understood to encompass disclosure of the act of "clamping"—whether explicitly discussed or not—and, conversely, were there effectively disclosure of the act of "clamping", such a disclosure should be understood to encompass disclosure of a "clamp" and even a "means for clamping" Such changes and alternative terms are to be understood to be explicitly included in the description.

Any acts of law, statutes, regulations, or rules mentioned in this application for patent; or patents, publications, or other references mentioned in this provisional application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

I. US Patent Documents

| DOCUMENT NO. & KIND CODE (if known) | PUBLICATION DATE (mm/dd/yyyy) | PATENTEE OR APPLICANT NAME |
|---|---|---|
| Des. 295,471 | 05/03/1988 | Lindskog |
| Des. 306,943 | 04/03/1990 | Hodge et al. |
| Des. 320,034 | 09/17/1991 | Brooks et al. |
| Des. 326,969 | 06/16/1992 | Eason et al. |
| Des. 329,342 | 09/15/1992 | Schoenig |
| Des. 336,099 | 06/01/1993 | Schoenig |
| Des. 356,901 | 04/04/1995 | Schoenig et al. |
| Des. 358,048 | 05/09/1995 | Schoenig et al. |
| Des. 364,281 | 11/21/1995 | Eason |
| Des. 372,691 | 08/13/1996 | Eason |
| Des. 375,639 | 11/19/1996 | House et al. |
| Des. 400,565 | 11/03/1998 | Ahl |
| Des. 400,735 | 11/10/1998 | House et al. |
| Des. 416,464 | 11/16/1999 | Eason |
| Des. 421,447 | 03/07/2000 | Eason et al. |
| Des. 435,365 | 12/26/2000 | Eason et al. |
| D 450,339 S | 11/13/2001 | Eason |
| D 492,587 S | 07/06/2004 | Eason |
| D 493,363 S | 07/27/2004 | Eason |
| D 742,453 | 10/27/1903 | Lake |
| 5,911,523 | 06/15/1999 | Burchart |
| 1,309,375 | 06/08/1919 | Taylor |
| 1,376,593 | 05/03/1921 | Tuttle |
| 1,970,624 | 08/21/1934 | Recker |
| 2,902,592 | 09/01/1959 | Cole et al. |
| 3,463,520 | 08/26/1969 | Turro |
| 3,603,623 | 09/07/1971 | Widman |
| 3,604,734 | 09/14/1971 | Friedman et al. |
| 3,823,245 | 07/09/1974 | Suzuki |
| 4,102,219 | 07/25/1978 | Plamper |
| 4,111,575 | 09/05/1978 | Hoshino |
| 4,140,415 | 02/20/1979 | Koyamato |
| 4,185,936 | 01/29/1980 | Takahaski |
| 4,227,049 | 10/07/1980 | Thomson et al. |
| 4,405,107 | 09/20/1983 | Clyburn |
| 4,430,017 | 02/07/1984 | Stefancich |
| 4,479,414 | 10/30/1984 | Willis |
| 4,579,229 | 04/01/1986 | Porcaro et al. |
| 4,593,422 | 06/10/1986 | Wolpert, Jr. et al. |
| 4,593,596 | 06/10/1986 | Gauger |
| 4,596,484 | 06/24/1986 | Nakatani |
| 4,606,525 | 08/19/1986 | Lombardi |
| 4,671,479 | 06/09/1987 | Johnson et al. |
| 4,691,611 | 09/08/1987 | May |
| 4,744,690 | 05/17/1988 | Hsieh |
| 4,761,092 | 08/02/1988 | Nakatani |
| 4,768,798 | 09/06/1988 | Reed et al. |
| 4,770,380 | 09/13/1988 | Eason et al. |
| 4,818,135 | 04/04/1989 | Desjardins |
| 5,029,796 | 07/09/1991 | Schoenig |
| 5,048,789 | 09/17/1991 | Eason et al. |
| 5,063,821 | 11/12/1991 | Battle |
| 5,069,254 | 12/03/1991 | Vogelsang |
| 5,140,889 | 08/25/1992 | Segan et al. |
| 5,154,449 | 10/13/1992 | Suei/Long |
| 5,161,761 | 11/10/1992 | May |
| 5,182,416 | 01/26/1993 | Schweizer |
| 5,337,646 | 08/16/1994 | Austin |
| 5,520,292 | 05/28/1996 | Lombardi |
| 5,531,148 | 07/02/1996 | Wilson |
| 5,570,968 | 11/05/1996 | Sassmannshausen et al. |

| DOCUMENT NO. & KIND CODE (if known) | PUBLICATION DATE (mm/dd/yyyy) | PATENTEE OR APPLICANT NAME |
|---|---|---|
| 5,726,369 | 03/10/1998 | Gilday |
| 5,744,738 | 04/28/1998 | Gatzen |
| 5,857,649 | 01/12/1999 | Eason |
| 5,929,355 | 07/27/1999 | Adinolfi |
| 5,949,008 | 09/07/1999 | Augsburger |
| 5,996,814 | 12/07/1999 | Workman et al. |
| 6,062,396 | 05/16/2000 | Eason |
| 6,283,421 B1 | 09/04/2001 | Eason et al. |
| 6,343,802 B1 | 02/05/2002 | Workman et al. |
| 6,375,135 B1 | 04/23/2002 | Eason et al. |
| 6,610,916 | 08/26/2003 | Torrez |
| 6,653,540 B2 | 11/25/2003 | Izen et al. |
| 6,719,257 B1 | 04/13/2004 | Greene et al. |
| 6,722,810 B1 | 04/20/2004 | Tachikawa |
| 6,789,772 B2 | 09/14/2004 | Eason |
| 6,814,332 B2 | 11/09/2004 | Eason |
| 6,856,253 | 12/24/1974 | Seebinger |

II. Foreign Patent Documents

| Foreign Patent Document Country Code, Number, Kind Code (if known) | PUB'N DATE mm/dd/yyyy | PATENTEE OR APPLICANT NAME |
|---|---|---|
| WO 95/20107 (PCT?NZ95/00004) | 07/27/1995 | Interlock Industries Limited |

III. Other Documents

Gibraltar Hardware, "Rack Factory" #GRS400C, Gibraltarhardware.com, Jan. 9, 2004, 2 pages
Gibraltar Hardware, "Rack Factory" GRS400C, Gibraltarhardware.com, Oct. 25, 2004, 2 pages, Ride/Crash Overhead Station and Xhat to boom and Rack Options
Gibraltar Hardware, "Rack Factory" GRS400C, Gibraltarhardware.com, Oct. 25, 2004, 2 pages, Mini Snare on Curved Support Tube Option
Gibraltar Hardware, "Rack Factory" GRS400C and GRS150C, Gibraltarhardware.com, Oct. 25, 2004, 2 pages, Boom Arm to Rack and Multi/Cymbal Overhead Station Options
Gibraltar Hardware, "Rack Factory" GRS250C, Gibraltarhardware.com, Oct. 25, 2004, 2 pages, Multi Cymbal Setup to rack, Mini Timbale to Rack, Tambourine to Open Tube, and Percussion Table to Open Tube Options
Gibraltar Hardware, "Rack Factory" GRS350C, Gibraltarhardware.com, Oct. 25, 2004, 2 pages, Triple Cymbal Station to Rack and Large Tom to Rack Options
Pintech, USA, Control the Sound with America's E Drum Color Brochure, 2004, 5 pages
Roland Corporation, roland.com MDS/10RD, printed from website as of Nov. 5, 2004
Roland Corporation, roland.com MDS/8C, printed from website as of Nov. 5, 2004
Roland Corporation, roland.com MDS/6, printed from website as of Nov. 5, 2004
Tama Hardware, PMD300FC Power Tower System, tama.com, Jan. 9, 2004, 1 page
Tama Hardware, PMD800SS Power Tower System, tama.com, Jan. 9, 2004, 2 pages
Ultimate Support Systems, Inc. 1994 Product Catalog
Ultimate Support Systems, Inc. 1996 Product Catalog
Ultimate Support Systems, Inc. 1999 Product Catalog
Ultimate Support Systems, Inc. 2000 Product Catalog
Ultimate Support Systems, Inc. 2001 Product Catalog
Ultimate Support Systems, Inc. 2002 Product Catalog
Ultimate Support Systems, Inc. 2003 Product Catalog
U.S. patent application No. 60/536,791 filed Jan. 14, 2004, 15 pages, 11 drawings
Yamaha Percussion System Drum Rack Thus, the applicant(s) should be understood to have support to claim and make a statement of invention to at least i) each of the devices (including support and attachment devices) as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. An adjustable telescoping member retention apparatus comprising:
    a compression sleeve element;
    a first elongated member having a first portion that said compression sleeve element at least partially surrounds; and
    a larger elongated member having a second portion that said compression sleeve element at least partially surrounds,
    wherein a third portion of said first elongated member is nested in at least a fourth portion of said larger elongated member,
    wherein said first portion is not nested in said larger elongated member, and
    wherein said compression sleeve element has a first elongated member compression surface and a larger elongated member compression surface, said apparatus further comprising:
    a single clamp activatable to generate a compressive force that retains said first elongated member in a desired fixed position relative to said larger elongated member, said single clamp established around said compression sleeve element so that, upon activation of said single clamp, said single clamp forces:
        said larger elongated member compression surface against said larger elongated member, and
        said first elongated member compression surface towards a site on said first elongated member, and
    a relative motion obstruction element adapted to prevent axial and rotational motion of said compression sleeve element relative to said larger elongated member when said single clamp is unclamped but still around said compression sleeve element,
    wherein said compression sleeve element is shaped to provide a clearance from said larger elongated member, between said first elongated member compression surface and said larger elongated member compression surface, to said compression sleeve element.

2. An adjustable telescoping member retention apparatus as described in claim 1 wherein said compression sleeve element is separated along at least one split from a first elongated member proximate edge of the compression sleeve element to a larger elongated member proximate edge of the compression sleeve element, wherein said at least a fourth portion of said larger elongated member has a larger elongated member longitudinal axis, and wherein said compression sleeve element is perpendicularly displaceable and perpendicularly removable, relative to said larger elongated member longitudinal axis, from said first elongated member and said larger elongated member upon unclamping of and effective disengagement of said single clamp.

3. An adjustable telescoping member retention apparatus as described in claim 2 wherein said at least one split is two splits.

4. An adjustable telescoping member retention apparatus as described in claim 1 wherein said single clamp has an eccentric cam.

5. An adjustable telescoping member retention apparatus as described in claim 1 wherein said third portion of said first elongated member has an outer surface sized to fit substantially against an inner surface of said at least a fourth portion of said larger elongated member.

6. An adjustable telescoping member retention apparatus as described in claim 1 wherein said compression sleeve element is radially displaceable and radially removable upon unclamping of and effective disengagement of said single clamp.

7. An adjustable telescoping member retention apparatus as described in claim 1 wherein each said first elongated member and said larger elongated member is hollow.

8. An adjustable telescoping member retention apparatus as described in claim 1 wherein said single clamp forces said first elongated member compression surface against a surface on said first elongated member that is not nested within said larger elongated member.

9. An adjustable telescoping member retention apparatus as described in claim 1 wherein said first elongated member has a circular cross-section.

10. An adjustable telescoping member retention apparatus as described in claim 1 wherein said relative motion obstruction element is established on said compression sleeve element and said larger elongated member.

11. An adjustable telescoping member retention apparatus as described in claim 10 wherein said relative motion obstruction element comprises at least one projection and at least one recess sized to accommodate said at least one projection, said at least one projection and said at least one recess established so that passage of said at least one projection into said at least one recess prevents said axial and rotational motion of said compression sleeve element relative to said larger elongated member.

12. An adjustable telescoping member retention apparatus as described in claim 11 wherein said at least one recess comprises at least one recess in said larger elongated member.

13. An adjustable telescoping member retention apparatus as described in claim 11 wherein said at least one recess comprises at least one hole.

14. An adjustable telescoping member retention apparatus as described in claim 13 wherein said at least one hole is through said larger elongated member.

15. An adjustable telescoping member retention apparatus as described in claim 11 wherein said at least one projection comprises at least one projection projecting inwardly from said compression sleeve element.

16. An adjustable telescoping member retention apparatus as described in claim 1 wherein said single clamp comprises a clamping lever.

17. An adjustable telescoping member retention apparatus as described in claim 1 wherein said single clamp comprises a threaded bolt and nut.

18. An adjustable telescoping member retention apparatus comprising:
a compression sleeve element;
a first elongated member having a first portion that said compression sleeve element at least partially surrounds; and
a larger elongated member having a second portion that said compression sleeve element at least partially surrounds,
wherein a third portion of said first elongated member is nested in at least a fourth portion of said larger elongated member,
wherein said first portion is not nested in said larger elongated member, and
wherein said compression sleeve element has a first elongated member compression surface and a larger elongated member compression surface,
said apparatus further comprising:
a single clamp activatable to generate a compressive force that retains said first elongated member in a desired fixed position relative to said larger elongated member, said single clamp established around said compression sleeve element so that, upon activation of said single clamp, said single clamp forces:
said larger elongated member compression surface against said larger elongated member, and
said first elongated member compression surface towards a site on said first elongated member, and
a relative motion obstruction element adapted to prevent axial and rotational motion of said compression sleeve element relative to said larger elongated member when said single clamp is unclamped but still around said compression sleeve element,
wherein said larger elongated member compression surface directly contacts said larger elongated member and said first elongated member compression surface directly contacts said first elongated member.

19. An adjustable telescoping member retention apparatus as described in claim 18 wherein said compression sleeve element is separated along at least one split from a first elongated member proximate edge of the compression sleeve element to a larger elongated member proximate edge of the compression sleeve element, wherein said at least a fourth portion of said larger elongated member has a larger elongated member longitudinal axis, and wherein said compression sleeve element is perpendicularly displaceable and perpendicularly removable, relative to said larger elongated member longitudinal axis, from said first elongated member and said larger elongated member upon unclamping of and effective disengagement of said single clamp.

20. An adjustable telescoping member retention apparatus as described in claim 19 wherein said at least one split is two splits.

21. An adjustable telescoping member retention apparatus as described in claim 18 wherein said single clamp has an eccentric cam.

22. An adjustable telescoping member retention apparatus as described in claim 18 wherein said third portion of said first elongated member has an outer surface sized to fit substantially against an inner surface of said at least a fourth portion of said larger elongated member.

23. An adjustable telescoping member retention apparatus as described in claim 18 wherein said compression sleeve element is radially displaceable and radially removable upon unclamping of and effective disengagement of said single clamp.

24. An adjustable telescoping member retention apparatus as described in claim 18 wherein said single clamp forces said first elongated member compression surface against a surface on said first elongated member that is not nested within said larger elongated member.

25. An adjustable telescoping member retention apparatus as described in claim 18 wherein said relative motion obstruction element is established on said compression sleeve element and said larger elongated member.

26. An adjustable telescoping member retention apparatus as described in claim 25 wherein said relative motion obstruction element comprises at least one projection and at least one recess sized to accommodate said at least one projection, said at least one projection and said at least one recess established so that passage of said at least one projection into said at least one recess prevents said axial and rotational motion of said compression sleeve element relative to said larger elongated member.

27. An adjustable telescoping member retention apparatus as described in claim 26 wherein said at least one recess comprises at least one recess in said larger elongated member.

28. An adjustable telescoping member retention apparatus as described in claim 26 wherein said at least one recess comprises at least one hole.

29. An adjustable telescoping member retention apparatus as described in claim 28 wherein said at least one hole is through said larger elongated member.

30. An adjustable telescoping member retention apparatus as described in claim 26 wherein said at least one projection comprises at least one projection projecting inwardly from said compression sleeve element.

31. An adjustable telescoping member retention apparatus as described in claim 18 wherein said single clamp comprises a clamping lever.

32. An adjustable telescoping member retention apparatus as described in claim 18 wherein said single clamp comprises a threaded bolt and nut.

* * * * *